United States Patent [19]

Libert

[11] Patent Number: 5,228,653
[45] Date of Patent: Jul. 20, 1993

[54] TENSION CLAMP FOR CABLE SUPPORTING AN INSULATED ELECTRICAL CONDUCTOR OR FOR AN INSULATED ELECTRICAL CABLE

[75] Inventor: Jean-Claude Libert, Moirans, France

[73] Assignee: Malico, Gieres, France

[21] Appl. No.: 904,586

[22] Filed: Jun. 26, 1992

[30] Foreign Application Priority Data

Jun. 27, 1991 [FR] France .................................. 91 08271

[51] Int. Cl.$^5$ .............................................. F16L 3/00
[52] U.S. Cl. ................................... 248/63; 24/115 M; 24/136 R; 174/40 CC; 403/314
[58] Field of Search ................... 248/74.1, 63, 67.5, 248/74.4, 74.5, 316.2, 316.3; 174/40 CC, 168, 174; 24/136 R, 36 L, 115 M; 403/314, 374, 409.1

[56] References Cited

U.S. PATENT DOCUMENTS

| | | | |
|---|---|---|---|
| 824,556 | 6/1906 | Lowry et al. | 24/136 R |
| 4,141,117 | 2/1979 | Van Gompel | 403/374 X |
| 4,339,213 | 7/1982 | Gilmore | 248/74.1 X |
| 4,407,471 | 10/1983 | Wilmsmann et al. | 24/136 R X |
| 4,504,034 | 3/1985 | Werner | 248/63 |
| 4,542,562 | 9/1985 | Okura | 24/136 R |
| 5,137,517 | 8/1992 | Loney et al. | 24/136 R X |
| 5,259,861 | 11/1992 | Anderson | 24/136 R X |

FOREIGN PATENT DOCUMENTS 0017049 10/1980 European Pat. Off.
0269533 6/1988 European Pat. Off.

Primary Examiner—Ramon O. Ramirez
Attorney, Agent, or Firm—Oliff & Berridge

[57] ABSTRACT

Tension clamp of the type including a sheath provided with an anchoring element and a tapered cavity inclined at a slight angle. In the cavity is a slidably mounted, transversely movable core including a single jaw having an abutting face against the cable. A part of the cavity of the sheath serves as a cradle for the cable and has a substantially semicylindrical cross-section with a radius matching that of the cable. A shell is provided between the part of the cavity of the sheath serving as a cradle for the cable and the cable. The shell is connected axially to the single jaw so as to follow its lengthwise movements, namely those parallel to the cable, but which is displaceable perpendicular to the lengthwise movements.

5 Claims, 1 Drawing Sheet

TENSION CLAMP FOR CABLE SUPPORTING AN INSULATED ELECTRICAL CONDUCTOR OR FOR AN INSULATED ELECTRICAL CABLE

BACKGROUND OF THE INVENTION

The present invention relates to a tension clamp for a cable supporting an insulated electrical conductor or for an insulated electrical cable.

French Patent 86 16027 teaches a tension clamp for an insulated electrical conductor equipped with a supporting cable, likewise insulated.

This clamp includes a sheath slit lengthwise, provided with an anchoring element and a tapered cavity inclined at a slight angle in which a compressible core is slidably mounted. The core has on each side a lengthwise cavity able to be enlarged laterally to accommodate an electrical conductor or its supporting cable and to be compressed at the same time as the core, around the electrical conductor or its supporting cable when the latter is displaced lengthwise toward the apex of the tapered cavity in the sheath, up to the point where it is blocked, thus locking the electrical conductor or its supporting cable by wedging action.

In this clamp, the compressible core includes two prismatic jaws forming wedges that are connected axially, but are capable of limited transverse movement, toward or away from each other.

This clamp, which gives complete satisfaction in application, suffers from the drawback of having two jaws forming wedges, which increases its selling price due to the cost of its manufacture and its installation, which is complex because of the need to connect the two jaws axially. Attempts have been made to eliminate one of the jaws by giving the part of it serving as a bearing in the cavity of the sheath, the shape of a cylindrical section serving as a cradle for the cable. Attempts made in this direction have proved fruitless since when the cable was energized, it and the single jaw slid in the sheath and the friction generated by the sliding of the cable in its cradle both braked this sliding, which impaired the grip of the cable, and strongly threatened to alter or even totally destroy the cable insulation. Moreover, forces generated by the wedging action of the cable between the single jaw and its cradle located in the sheath cavity have the effect of expelling the jaw.

SUMMARY OF THE INVENTION

A goal of the present invention is to overcome these drawbacks by providing a tension clamp of the aforesaid type with a single jaw allowing good wedging of the cable with no risk of deterioration of the sheath or expulsion of the jaw.

For this purpose, a shell is provided in the clamp, inserted between a part of the sheath cavity serving as a cradle for the cable and the cable itself, the shell being connected axially to the single jaw so as to follow lengthwise movements thereof, namely those parallel to the cable axes, but which is displaceable in both directions perpendicular to the foregoing direction.

This presence of this shell, which does not prevent the cable from wedging, has the advantage of protecting the latter against the danger of its insulation being torn off by friction against its cradle in the sheath cavity.

In addition, by a judicious choice of the material from which the shell is made, it allows respective coefficients of friction to be adapted, thus preventing the cable from sliding in the sheath more than the single jaw. For example, when the sheath is made of fiberglass-reinforced polyamide, the shell is made of polystyrene, which has a better frictional coefficient relative to the polyamide sheath than polyethylene cable insulation.

According to one highly advantageous embodiment of the invention, an axial link between the shell and the single jaw ensures elastic recoil of the shell in the jaw direction, or conversely, for example by engagement of one partially bent lengthwise edge of the shell in a lateral slot of the jaw.

An abutting face of the single jaw, having a surface that abuts the cable, can be in the form of a simple cradle shaped like a section of a cylinder, with or without rough areas, and with a diameter adjusted to that of the cable, if strain on the cable permits.

If the cable thus gripped is only a supporting cable and no current normally passes through it, the abutting face of the single jaw applied against the cable may be equipped with a metal bar provided with a serration oriented such that it can be pressed against the cable when the clamp is tightened.

The profile of the cross-section of the single jaw can be of any shape, such as rectangular or square in particular. However, to minimize the areas in which the sheath could begin to break, a bearing face of the jaw opposite the abutting face is advantageously semicylindrical, with a bearing part of the cavity that the bearing face of the jaw abuts having a cross-section with a matching shape, namely without internal angles which are often areas where breakage begins.

BRIEF DESCRIPTION OF THE DRAWINGS

The invention will be thoroughly understood with the aid of the description hereinbelow, with reference to the attached schematic drawing showing, as a non-limiting example, one embodiment of this clamp, wherein.

DETAILED DESCRIPTION OF PREFERRED EMBODIMENTS

Figure 1:
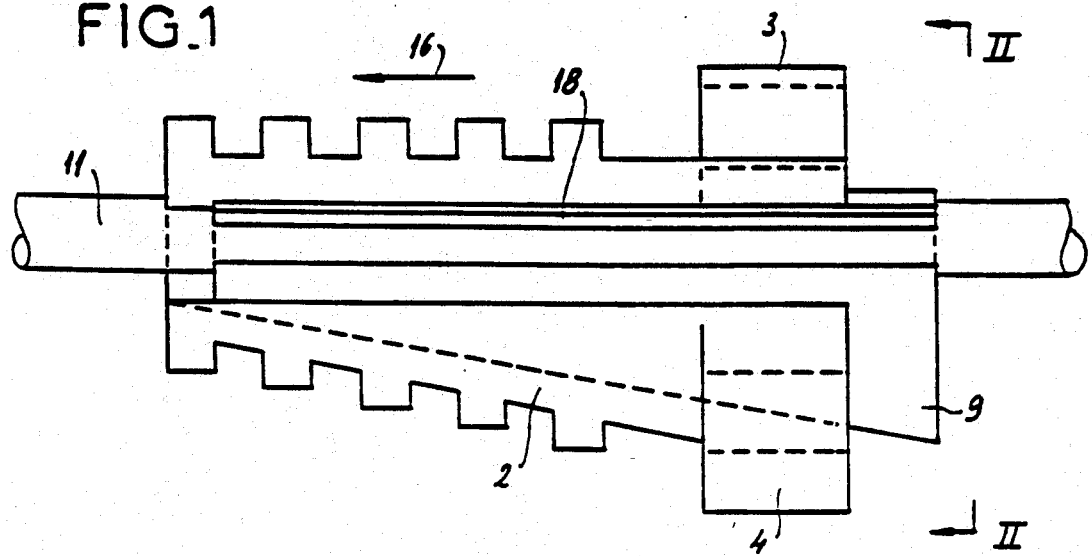
FIG. 1 is a side elevation of a tension clamp according to the present invention.

As the drawings show, a tension clamp is of the type having a sheath 2 slit lengthwise, provided with an anchoring element, of which only ears 3 and 4, having holes 5 and 6 respectively used for hanging the element, are visible in the drawing. This sheath 2 has a lengthwise cavity 7 opened laterally by a lengthwise slit 8 in which is slidably mounted a transversely movable core having a single jaw 9. An abutting face 12 of jaw 9 facing a cable 11 to be anchored, having a lengthwise axis 11a, has a cylindrical section of a diameter matching that of cable 11 and possibly provided with rough areas improving its frictional coefficient relative to the insulation of cable 11.

Figure 2:
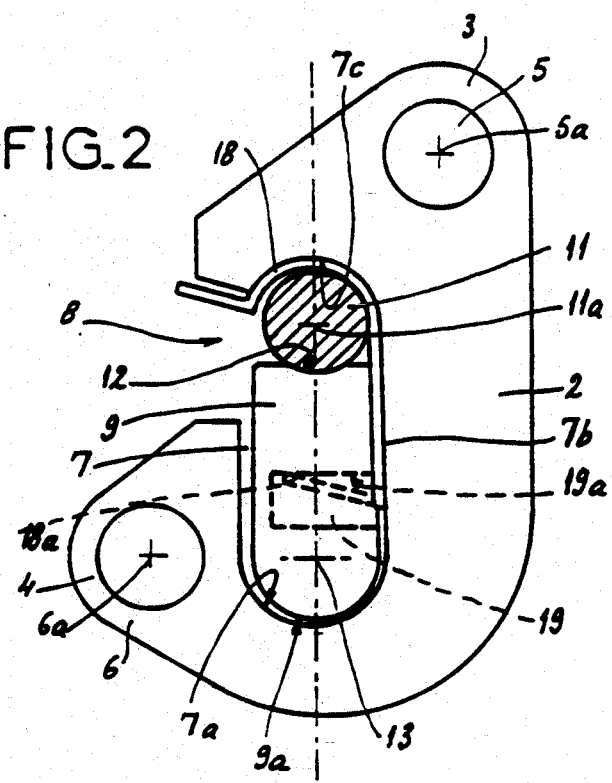
FIG. 2 is a cross-section on an enlarged scale along line II—II in FIG. 1.

As shown particularly in FIG. 2, bearing face 9a of jaw 9 abutting a tapered bearing part 7a of cavity 7 of sheath 2 serving as an accommodation therefor, and bearing part 7a serving as a bed of cavity 7 have matching semicylindrical cross-sections, with a common lengthwise axis 13 which has the advantage of eliminating angular zones and hence considerably reducing zones at which breakage could start.

Part 7c of cavity 7 which serves as a cradle for cable 11 and which is accordingly opposite part 7a which serves as a bed for single jaw 9, also has a substantially semicylindrical cross-section whose radius matches that of cable 11.

To avoid the effect of expulsion of jaw 9, in contact with cable 11, abutting face 12 is advantageously displaced toward a bottom 7b of cavity 7 of sheath 2, namely in a direction opposite that of lengthwise slit 8 of cavity 7 relative to a diametral plane containing axis 13 and cable axis 11a.

Thus, the reaction forces generated by the wedging of cable 11 between abutting face 12 of jaw 9 and cradle part 7c of cavity 7 of sheath 2 tend to cause jaw 9 to pivot about axis 13 of bearing face 9a of jaw 9 toward the bottom 7b of cavity 7 so that jaw 9 is not subjected to any expulsive force.

With this clamp, the pull of cable 11 in the direction of arrow 16, after sheath 2 has been anchored to a fixed support by means of its anchoring element, has the effect of causing both the cable 11 and jaw 9 to slide in the same direction. As a result, cable 11 becomes wedged against cradle 7c by the compression exerted thereon opposite cradle 7c by the abutting face 12 of jaw 9.

The frictional forces between the cable and cradle 7c in the sheath 2 have the disadvantage of braking this sliding action and, as a result, decreasing the transverse wedging forces on cable Moreover, the friction of cable 11 against cradle 7c, in cavity 7 of sheath 2, threatens to alter the sheath 2 if not destroy it altogether.

To eliminate this risk, according to the invention and as is particularly apparent from FIG. 2, a shell 18 able to match the substantially semicylindrical profile of cradle 7c is inserted between cable 11 and cradle 7c. The shell 18 is connected axially to single jaw 9 in order to follow lengthwise movements of the jaw 9, namely those parallel to the axis 11a of cable 11, but also so as to be displaceable in both directions perpendicular to the aforesaid direction of cable 11.

The presence of this shell 18, which does not prevent cable 11 from being wedged, has the advantage of protecting the cable 11 against t he risk of its insulation being stripped by friction against cradle 7c in cavity 7 of sheath 2.

Moreover, by a judicious choice of the material from which it is made, the shell 18 allows the respective frictional coefficients of single jaw 9 and shell 18 to be adapted relative to surfaces 7b and 7c of cavity 7, which surfaces the shell 18 abuts.

For example, it is recognized that the insulation of cable 11, generally made of polyethylene, relative to the material of which sheath 2 is comprised, usually fiberglass-reinforced polyamide, has a lower coefficient of friction than jaw 9, which results in cable 11 sliding more in sheath 2 than jaw 9.

The shell 18 is advantageously made of polystyrene, which has a better coefficient of friction relative to sheath 2 made of polyamide than the polyethylene insulation of cable 11.

In the example illustrated in the drawings, an axial connection between shell 18 and jaw 9 is produced by engagement of a lengthwise tab 18a provided along the edge of shell 18, pinched between surface 7b and a rear face of jaw 9, so that tab 18a can be engaged in a lengthwise slot 19 opening on the aforesaid rear face of jaw 9. Slot 19 is located at right angles to tab 18a and with the same length as tab 18a. Moreover, the width of the aforesaid lengthwise slot 19 is greater than that of tab 18a so as to allow relative transverse movement between shell 18 and jaw 9.

Finally, tab 18a is bent such that it can be in continuous contact With a lateral face 19a of slot 19 in order to generate continuously an elastic recoil force of the part of shell 18 between cable 11 and cradle 7c, in the direction of abutting face 12 of jaw 9.

This arrangement facilitates installation of the tension clamp on cable 11 since, even before wedging in sheath 2, cable 11 is held in contact with abutting face 12 of jaw 9 such that the risk of it escaping during installation are considerably decreased.

Moreover, as also shown in FIG. 2, holes 5 and 6 in pierced ears 3 and 4 are advantageously positioned such that when cable 11 is wedged in sheath 2, their respective axis 5a and 6a are aligned With a center of cable 11 in the diametral plane, substantially equidistant from said axis 11a, but offset obliquely relative to cavity 7 of sheath 2.

This arrangement has the advantage of preserving the balance of the forces exerted by cable 11 on sheath 2 of this clamp While considerably reducing its size.

In the examples illustrated in the drawings, abutting face 12 of jaw 9 abutting cable 11 is shaped like a cylindrical section, possibly provided with rough areas. This arrangement, which is possible when cable 11 is normally traversed by an electric current or when strain on the cable is relatively low, is not the only arrangement possible in this tension clamp. Indeed, a metal bar with a serration that can be pressed against the insulation of a supporting cable could just as well be provided instead of cylindrical abutting face 12.

What is claimed is:

1. A tension clamp for a cable having a radius and a lengthwise axis, said tension clamp comprising:
    a transversely movable single jaw, said single jaw having an abutting face for abutting said cable, said abutting face serving as a cradle for said cable and having a substantially semicylindrical cross-section with a radius substantially matching the radius of said cable;
    a sheath provided with an anchoring element and a tapered cavity inclined at a slight angle, said cavity capable of slidably mounting said transversely movable single jaw, said cavity having a lengthwise slit providing a lateral opening, said cavity having an abutting part, a bearing part opposite said abutting part, a front part facing said lengthwise slit, and a bottom part opposite said slit, said bearing part having a lengthwise axis, said cable axis and said bearing part axis being contained within a diametral plane; and
    a shell provided between said abutting part of said cavity and said cable, said shell being connected axially to said single jaw so as to follow lengthwise movements of said jaw parallel to said cable, said shell being displaceable perpendicular to the lengthwise movements.

2. The tension clamp according to claim 1, wherein said shell has a bent lengthwise edge and the axial connection between said shell and said single jaw is arranged to ensure elastic recoil of said shell toward said jaw by engagement of the bent lengthwise edge of said shell in a lateral slot of said jaw.

3. The tension clamp according to claim 1, wherein said anchoring element comprises two ears and two holes, each ear having one of said holes therein, said holes of said ears being disposed obliquely relative to said diametral plane, said holes having axes which are aligned with said axis of said cable when the cable is wedged in said sheath, said holes being substantially equidistant from said axis of said cable.

4. The tension clamp according to claim 1, wherein said cable has insulation made of polyethylene, said sheath is made of fiberglass-reinforced polyamide and said shell is made of polystyrene.

5. The tension clamp according to claim 1, wherein said abutting face is offset toward said bottom part of said cavity, in a direction opposite that of said lengthwise slit of said cavity relative to the diametral plane.

* * * * *